Sept. 8, 1970   A. G. DI MURIA   3,527,391
MEANS FOR EXPELLING LIQUID FROM A CONTAINER BY APPLIED
EXTERNAL PRESSURE
Filed Feb. 15, 1968   2 Sheets-Sheet 1

ANTHONY G. DIMURIA
INVENTOR
BY
Edward Hooper III
HIS ATTORNEY

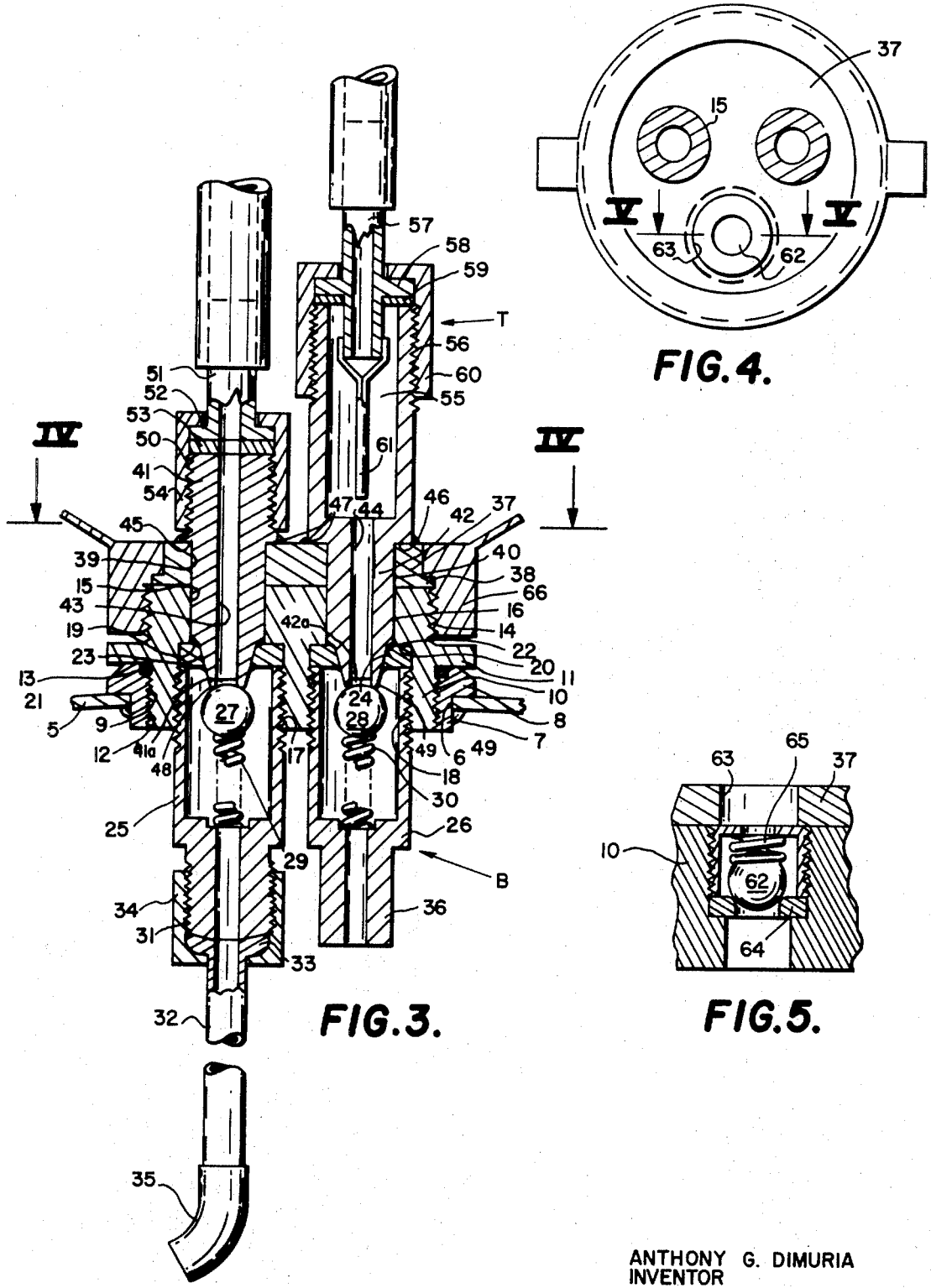

United States Patent Office 3,527,391
Patented Sept. 8, 1970

3,527,391
MEANS FOR EXPELLING LIQUID FROM A CONTAINER BY APPLIED EXTERNAL PRESSURE
Anthony George DiMuria, 5717 W. Coolidge,
Phoenix, Ariz. 85031
Filed Feb. 15, 1968, Ser. No. 705,675
Int. Cl. B65d 83/14
U.S. Cl. 222—400.7                    5 Claims

ABSTRACT OF THE DISCLOSURE

A liquid container having two generally side by side openings, one for ingress of pressure applying medium and the other for egress of liquid, valve means normally maintaining said openings closed and a unit having a connection to a source of pressure applying medium and a liquid dispensing connection adapted to be applied to the container, the unit having means for operating the valve means to open said openings and thus put said container in communication with said connections respectively. Each opening may have a valve seat with a valve element normally maintained resiliently seated thereon and each connection is dimensioned to project through its corresponding valve seat and to unseat the valve element associated therewith when the unit is applied to the container, said connections sealingly engaging said valve seats before unseating the respective valve elements whereby each valve seat also acts as a seal for one of said connections.

---

This invention relates to means for expelling liquid from a container by applied external pressure. While the invention has broad application it is particularly well adapted for use in dispensing beer from a barrel or keg. For purposes of explanation and illustration the invention will be described as embodied in means for dispensing beer from a barrel, as in the dispensing of draught beer in a tavern, but it is to be distinctly understood that the invention has other applications. The dispensing container may take various forms, the liquid being expelled or dispensed from the container may be any liquid and the pressure applying medium, which is preferably carbon dioxide in the case of dispensing beer, may in other cases be compressed air or other gas.

Draught beer is delivered in barrels or kegs from the brewery to the dealer of customer. Barrels of draught beer may be delivered to a tavern where the beer is served by the glass. It is necessary at the tavern to apply to the barrel a tapping unit to permit measured amounts of beer to be expelled or dispensed from the barrel by the bartender.

It is customary in dispensing beer from a barrel to provide a source of carbon dioxide gas under pressure with a connection to the barrel and another connection from the barrel to the tap valve, the carbon dioxide under pressure constituting pressure applying medium for expelling beer through the tap valve when the tap valve is opened by the bartender. Many different provisions have been made for making at the tavern the connections between the barrel and the source of pressure applying medium on the one hand and the tap valve on the other hand. Such provisions have entailed in many cases complex and expensive mechanism or mechanism which is difficult to apply or which requires more space for application of the mechanism than the space provided by the enclosure in which the barrel is disposed at the tavern when its contents are being dispensed.

I provide means for expelling liquid from a container by applied external pressure especially adapted for dispensing beer from a barrel in a tavern, which means are relatively low in cost, easy to apply and foolproof in operation and which have certain advantages which will be pointed out below. I provide a container adapted to contain liquid, the container having two generally side by side openings, one for ingress of pressure applying medium and the other for egress of liquid, valve means normally maintaining said openings closed and a unit having a connection to a source of pressure applying medium and a liquid dispensing connection adapted to be applied to the container with the first mentioned connection entering the first mentioned opening and the second mentioned connection entering the second mentioned opening, the unit having means for operating the valve means to open said openings in communication with said connections when the unit is applied to the container. Means are preferably included for sealing the first mentioned connection to the first mentioned opening and sealing the second mentioned connection to the second mentioned opening before operation of the valve means to open the openings in communication with the connections. Each opening may have a valve seat with a valve element normally maintained resiliently seated thereon and each connection may project through the corresponding valve seat when the unit is applied to the container unseating the valve element and sealing to the valve seat whereby each valve seat also acts as a seal. The valve seats are desirably formed of yieldable material which is somewhat deformed by the connections to form tight seals before the connections unseat the valve elements.

I desirably provide coacting threaded elements for applying the unit to the container so that as the unit is tightened to the container thereby the connections gradually enter the respective openings. The container may have an externally threaded neck through which the unit is applied with a nut threaded onto the neck and bearing against the unit so that as the nut is turned the connections gradually enter the respective openings.

The two generally side by side openings of the container may be formed in a fitting which is applied to the body of the container with the unit being applied to the fitting. The openings are desirably positioned in the fitting non-symmetrically with respect to the axis of the fitting and the connections are preferably similarly positioned in the unit so that the unit can only be applied to the container with the first mentioned connection entering the first mentioned opening and the second mentioned connection entering the second mentioned opening.

I desirably provide for the container even before application of the unit to have a pressure relief valve for permitting escape of pressure applying medium from the container when the pressure within the container becomes excessive. The unit when applied is provided with an opening registering with the pressure relief valve permitting escape therethrough of pressure applying medium from the container. Guide means are preferably provided for the connections guilding the connections into the openings when the unit is applied to the container.

I further provide a series of containers of the type above described in which the second mentioned connection of a tap unit applied to a container in the series extends to the first mentioned connection of the tap unit applied to the next container in the series whereby liquid expelled from the first mentioned container is delivered to the second mentioned container to be in turn expelled from the second mentioned container through the second mentioned connection of the tap unit applied thereto.

Other details, objects and advantages of the invention will become apparent as the following description of a present preferred embodiment thereof proceeds.

In the accompanying drawings I have shown a present preferred embodiment of the invention in which:

FIG. 3 is an enlarged fragmentary cross-sectional view of the principal parts of the structure constituting my invention;

FIG. 4 is a transverse cross-sectional view taken on the line IV—IV of FIG. 3; and FIG. 5 is a fragmentary vertical cross-sectional view taken on the line V—V of FIG. 4.

Figure 1:
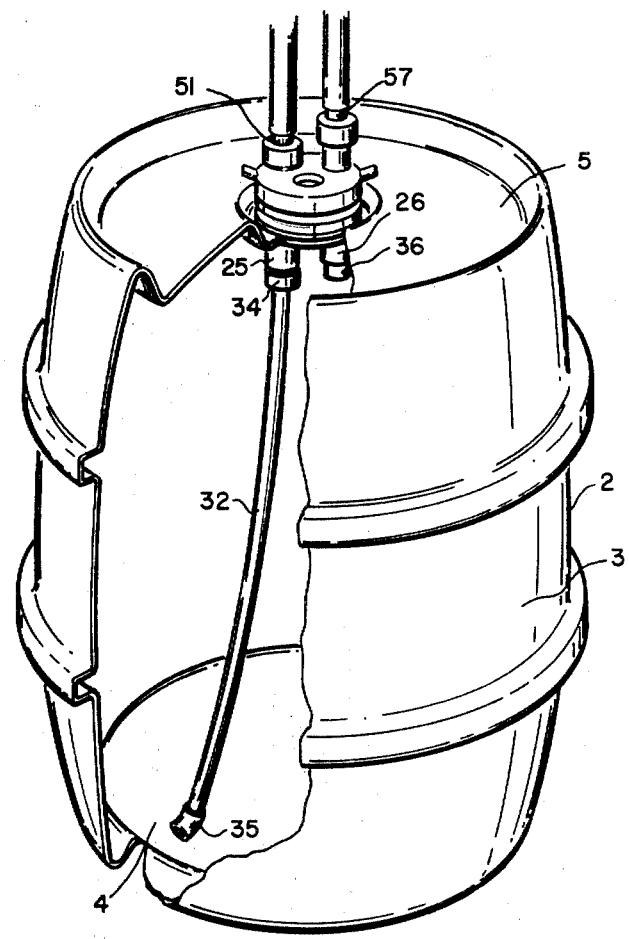
FIG. 1 is a perspective view with a portion cut away of a beer barrel having my invention applied thereto.

Referring now more particularly to the drawings, FIG. 1 shows a beer barrel designated generally by reference numeral 2 which may be of conventional construction. For purposes of explanation and illustration the beer barrel 2 will be deemed to be made of stainless steel although it may be made of aluminum or other material. The barrel 2 consists of a generally cylindrical but somewhat bulged body 3, a bottom 4 and a top 5. Referring now more particularly to FIG. 3, the top 5 of the barrel has formed therein an opening 6 in which is disposed a fitting 7. The fitting 7 projects a short distance into the barrel below the top 5 and has a peripheral enlargement or flange 8 seated atop the barrel. The fitting 7 is permanently attached to the barrel so as to form in essence an integral part thereof. It may, for example, be welded or brazed to the top 5 of the barrel. The fitting 7 is internally threaded as shown at 9.

When the barrel 2 filled with beer is delivered from the brewery it contains what I term a barrel unit designated B in FIG. 3. At the tavern a tapping unit T is applied. I shall first describe the barrel unit B. That unit comprises a circular body 10 having intermediate its top and bottom a peripheral flange 11. The portion of the body 10 below the flange 11 is externally threaded at 12 and is screwed into the fitting 7 and sealed to the fitting 7 by an O ring 13 with the flange 11 seated atop the fitting 7. The portion of the body 10 above the flange 11 is externally threaded at 14.

Formed through the body 10 are two bores 15 and 16 each having an upper portion of relatively small diameter and a lower portion of relatively great diameter. The lower portion of the bore 15 is internally threaded at 17 and the lower portion of the bore 16 in internally threaded at 18. A shoulder 19 is formed in the bore 15 between the upper and lower portions thereof and a similar shoulder 20 is formed in the bore 16 between the upper and lower portions thereof. A combination valve seat and seal element 21 is seated against the shoulder 19 and a similar combination valve seat and seal element 22 is seated against the shoulder 20. The element 21 has therethrough a central opening 23 and the element 22 has therethrough a central opening 24. The elements 21 and 22 may be made of Teflon or other material having similar characteristics so as to be yieldable to a desired extent in the performance of their sealing function and also be adapted to function as valve seats as will presently be described.

Threaded into the enlarged lower portion of the bore 15 is a valve casing 25 and threaded into the enlarged lower portion of the bore 16 is a valve casing 26. The upper end of the valve casing 25 is disposed against the element 21 and the upper end of the valve casing 26 is disposed against the element 22. Disposed in the valve casing 25 is a ball valve 7 and disposed in the valve casing 26 is a ball valve 28. Compression coil springs 29 and 30 respectively normally press the ball valves 27 and 28 against the elements 21 and 22 when such elements serve as valve seats and thus close the openings 23 and 24.

The lower end of the valve casing 25 is reduced and externally threaded as shown at 31 and a pipe 32 having a flange 33 at its upper end is connected to the bottom of the valve casing 25 by a hooded nut 34 as shown in FIG. 3. The pipe 32 has an elbow 35 at its bottom. As shown in FIG. 1, the pipe 32 with the elbow 35 at its bottom extends down to the bottom of the barrel 2. The lower end of the valve casing 26 is reduced as shown at 36 and terminates in the upper portion of the barrel 2.

Thus the barrel unit is composed of the elements 10 through 36 connected together as a unit and applied to the fitting 7 at the brewery and delivered with the barrel of beer to the tavern. When the barrel filled with beer is delivered from the brewery the valves 27 and 28 are firmly seated against the elements 21 and 22 closing the openings 23 and 24 and maintaining the beer sealed in the barrel.

The tapping unit T will now be described. It is applied to the barrel at the tavern. The tapping unit T comprises a circular plate 37 having at its bottom a peripheral flange 38 as shown in FIG. 3. The diameter of the flange 38 approximates the diameter of the upper portion of the body 1, and when the tapping unit T is applied the plate 37 is adapted to seat atop the body 10. The plate 37 has therethrough bores 39 and 40 which are positioned in the plate 37 in the same locations therein as the bores 15 and 16 are positioned in the body 10 so that when the plate 37 is seated atop the body 10 the bore 39 will align with the bore 15 and the bore 40 will align with the bore 16. Entering the bore 39 is a probe 41 and entering the bore 40 is a probe 42. The probes 41 and 42 have central bores 43 and 44 therethrough respectively. The probes have shoulders 45 and 46 respectively which seat on the plate 37, and the probes are welded to the plate at 47. The lower ends of the probes 41 and 42 are notched as shown at 41a and 42a respectively and extend well below the plate 37 and have reduced tapered noses 48 and 49 respectively as clearly shown in FIG. 3. The notches 41a and 42a are dimensioned with respect to the thickness of the seat elements 21 and 22 to insure sealing of the probes 41 and 42 before said valves are unseated. Preferably the thickness of the seat elements 21 and 22 is greater than the depth of said notches, as shown. The bores 39 and 40 in the plate 37 are dimensioned to snugly fit with the respective probes 41 and 42 whereby to accurately guide the lower tapered ends of said probes into the apertures of the respective valve seat and seal elements 21 and 22, and thus preclude damage to the inner sealing surfaces of said elements by the unintentional engagement of the notched ends of said probes with said seals.

The upper end of the probe 41 is externally threaded as shown at 50 and a connector 51 having a flange 52 is sealed to the upper end of the probe 41 by a sealing gasket 53 and held in place by a hooded nut 54. A passage extends through the gasket 53 and the connector 51 which communicates with the bore 43 so that there is an open passageway completely through the probe, the gasket and the connector.

The upper portion of the probe 42 has a chamber 55 and its upper end is externally threaded at 56. A connector 57 having a flange 58 is sealed to the upper end of the probe 42 by a sealing gasket 59 and held in place by a hooded nut 60. The lower end of the connector 57 extends down into the chamber 55 as clearly shown in FIG. 3 and has applied thereto a check valve of known type consisting of a tube of rubber or similar flexible material the upper end of which is applied to the portion of the connector 57 which extends down into the chamber 55 and the lower portion of which normally assumes a flat closed position as shown in FIG. 3. The check valve 61 permits flow downwardly through the connector 57 but not upwardly therethrough.

A pressure relief valve 62 is mounted in the body 10 in position relatively to the bores 15 and 16 as shown in FIG. 4. The plates 37 has therethrough an opening 63 which when the plate 37 is seated atop the body 10 aligns with the pressure relief valve 62. The pressure relief valve 62 is held against its seat 64 by a compression coil spring 65. It acts as a safety valve permitting escape of pressure from the barrel in case the pressure should exceed a predetermined amount. Since the pressure relief valve 62 is in the body 10 it is present when the barrel of beer is delivered from the brewery and effective to relieve the pressure in the barrel if it should rise too high even before the barrel reaches the tavern.

When the barrel of beer with the barrel unit B therein is delivered from the brewery a dust cap (not shown) is applied to the upper portion of the body 10 since the tapping unit T is not in place at that time. When the barrel is received at the tavern the dust cap is removed and the tapping unit T is applied. The tapping unit is positioned above the body 10 and the probes 41 and 42 are inserted downwardly into the bores 15 and 16. The plate 37 seats atop the body 10. A nut 66 is applied to the top of the body 10 and turned down thereon by threads meshing with the threads 14. The upper reduced portion of the nut 66 seats atop the flanges 38 of the plate 37 and maintains the plate tight upon the top of the body 10.

As the tapping unit is being applied to the barrel unit the noses 48 and 49 of the probes 41 and 42 enter and pass through the elements 21 and 22 and seal against the peripheries of the openings 23 and 24. Such seal is effected while the ball valves 27 and 28 are seated on the elements 21 and 22 maintaining the beer in the barrel sealed from the outside. Upon continued downward movement of the tapping unit T the noses of the probes engage and unseat the valves 27 and 28 until when the tapping unit has been fully applied the parts assume the relative positions shown in FIG. 3. The passags through the probes are thus brought into communication with the passages through the valve casings.

Before the tapping unit is applied the connector 51 is connected with the tap valve while the connector 57 is connected with a source of pressure applying medium which in the case of beer is generally carbon dioxide gas under pressure. When the tap valve is closed no beer is delivered from the barrel. When the tap valve is opened the pressure exerted by the pressure applying medium opens the check valve 61 and causes beer to flow up through the pipe 15, the valve casing 25, the probe 41 and the connector 51 and out through the tap valve. When the tap valve is closed the check valve 61 automatically closes preventing reverse flow through the connector 57.

Figure 2:
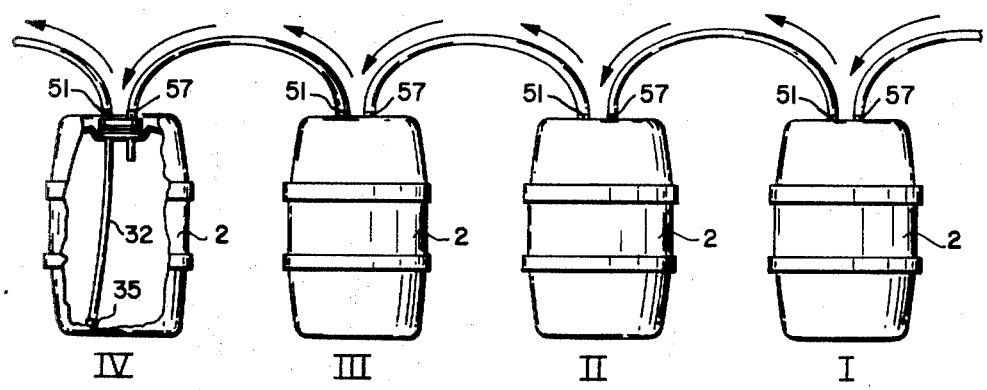
FIG. 2 is a diagram of four beer barrels connected together in series employing my invention.

The diagram of FIG. 2 illustrates how my invention provides for the connecting of a number of barrels in series. FIG. 2 shows four barrels designated respectively I, II, III and IV. The beer outlet from barrel I is connected with the pressure applying medium inlet of barrel II, the beer outlet of barrel II is connected with the pressure applying medium inlet of barrel III and the beer outlet of barrel III is connected with the pressure applying medium inlet of barrel IV. The beer outlet of barrel IV is connected with the tap valve.

While I have shown and described a present preferred embodiment of the invention it is to be distinctly understood that the invention is not limited thereto but may be otherwise variously embodied within the scope of the following claims.

I claim:
1. Means for expelling liquid from a container by applied external pressure comprising a container adapted to contain liquid, the container having two generally side by side openings, one for ingress of pressure applying medium and the other for egress of liquid, each opening having a combination valve seat and seal element of yieldable material, valves normally seated against said combination valve seat and seal elements maintaining said openings closed and a unit having a connection to a source of pressure applying medium and a liquid dispensing connection adapted to be applied to the container with the first-mentioned connection entering the first-mentioned opening and the second-mentioned connection entering the second-mentioned opening, the unit having means for passing through and sealing to while slightly deforming said combination valve seat and seal elements and operating the valves to open said openings and place the interior of the container in communication with said connections when the unit is applied to the container, and means for effecting the sealing of the first-mentioned connection to the first-mentioned opening and the sealing of the second-mentioned connection to the second-mentioned opening before operation of the valves, the two generally side by side openings of the container being formed in a fitting including means by which said fitting is applied to the body of the container from the exterior thereof, and the unit is applied to the fitting, the two generally side by side openings are of the same size and are positioned in the fitting non-symmetrically with respect to the axis of the fitting and the connections are similarly positioned in the unit so that the unit can only be applied to the container with the first-mentioned connection entering the first-mentioned opening and the second-mentioned connection entering the second-mentioned opening.

2. Means for expelling liquid from a container by applied external pressure comprising a container adapted to contain liquid, the container having two generally side by side openings, one for ingress of pressure applying medium and the other for egress of liquid, each opening having a combination valve seat and seal element of yieldable material, valves normally seated against said combination valve seat and seal elements maintaining said openings closed and a unit having a connection to a source of pressure applying medium and a liquid dispensing connection adapted to be applied to the container with the first-mentioned connection entering the first-mentioned opening and the second-mentioned connection entering the second-mentioned opening, the unit having means for passing through and sealing to while slightly deforming said combination valve seat and seal elements and operating the valves to open said openings and place the interior of the container in communication with said connections when the unit is applied to the container, and means for effecting the sealing of the first-mentioned connection to the first-mentioned opening and the sealing of the second-mentioned connection to the second-mentioned opening before operation of the valves, the two generally side by side openings of the container being formed in a fitting including means by which said fitting is applied to the body of the container from the exterior thereof, and the unit is applied to the fitting, the fitting having therein a pressure relief valve for permitting escape of pressure applying medium from the container when the pressure within the container becomes excessive said unit being provided with an opening which is so oriented with respect to said connections that when the unit is applied to said fitting said opening in the unit registers with the pressure relief valve permitting escape through that opening of pressure applying medium from the container when the pressure within the container becomes excessive.

3. Means for expelling liquid from a container by applied external pressure comprising a container adapted to contain liquid, the container having two generally side by side openings, one for ingress of pressure applying medium and the other for egress of liquid, each opening having a combination valve seat and seal element of yieldable material, valves normally seated against said combination valve seat and seal elements maintaining said openings closed and a unit having a connection to a source of pressure applying medium and a liquid dispensing connection adapted to be applied to the container with the first-mentioned connection entering the first-mentioned opening and the second-mentioned connection entering the second-mentioned opening, the unit having means for passing through and sealing to while slightly deforming said combination valve seat and seal elements and operating the valves to open said openings and place the interior of the container in communication with said connections when the unit is applied to the container, and means for effecting the sealing of the first-mentioned connection to the first-mentioned opening and the sealing of the second-mentioned connection to the second-mentioned opening before operation of the valves said last recited means includes a notch in the valve operating portion of the connections of said unit, which notch is dimensioned with respect to the thickness of said valve seat element to insure an effective seal between the connections and said valve seats before said connections operate the valves to open position, and guide means for the connections guiding the connections into said openings when the unit is applied to the container.

4. Means for expelling liquid from a container by applied external pressure comprising a container adapted to contain liquid, the container having two generally side by side openings, one for ingress of pressure applying medium and the other for egress of liquid, each opening having a combination valve seat and seal element of yieldable material, valves normally seated against said combination valve seat and seal elements maintaining said openings closed and a unit having a connection to a source of pressure applying medium and a liquid dispensing connection adapted to be applied to the container with the first-mentioned connection entering the first-mentioned opening and the second-mentioned connection entering the second-mentioned opening, the unit having means for passing through and sealing to while slightly deforming said combination valve seat and seal elements and operating the valves to open said openings and place the interior of the container in communication with said connections when the unit is applied to the container, and means for effecting the sealing of the first-mentioned connection to the first-mentioned opening and the sealing of the second-mentioned connection to the second-mentioned opening before operation of the valves, said last recited means includes a notch in the valve operating portion of the connections of said unit, which notch is dimensioned with respect to the thickness of said valve seat element to insure an effective seal between the connections and said valve seats before said connections operate the valves to open position.

5. Means for expelling liquid from a container by applied external pressure as claimed in claim 4 wherein the thickness of said valve seat elements is greater than the depth of said notches.

References Cited

UNITED STATES PATENTS

| | | | |
|---|---|---|---|
| 2,747,775 | 5/1956 | Pritchard | 222—400.7 |
| 3,374,927 | 3/1968 | Schmidt | 222—400.7 X |
| 3,473,556 | 10/1969 | Johnson et al. | 222—400.7 X |
| 1,223,047 | 4/1917 | Heitz et al. | 222—396 |
| 1,964,345 | 6/1934 | Feller | 222—396 X |
| 2,994,421 | 8/1961 | Yingst et al. | 222—399 X |
| 3,143,253 | 8/1964 | Lindgren et al. | 222—396 |
| 3,228,413 | 1/1966 | Stevens | 222—400.7 X |
| 3,371,822 | 3/1968 | Galloway | 222—400.7 X |

FOREIGN PATENTS 103,116  5/1899  Germany.

ROBERT B. REEVES, Primary Examiner

F. R. HANDREN, Assistant Examiner

UNITED STATES PATENT OFFICE
CERTIFICATE OF CORRECTION

Patent No. 3,527,391            Dated September 8, 1970

Inventor(s) ANTHONY GEORGE DIMURIA

It is certified that error appears in the above-identified patent and that said Letters Patent are hereby corrected as shown below:

Column 2, line 58, change "guilding" to --guiding--. Column 3, line 67, change "7" to --27--. Column 4, line 19, change "1" to --10--; line 72, change "plates" to --plate--. Column 5, line 19, change "flanges" to --flange--; line 31, change "passags" to --passages--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents